Patented Apr. 21, 1953

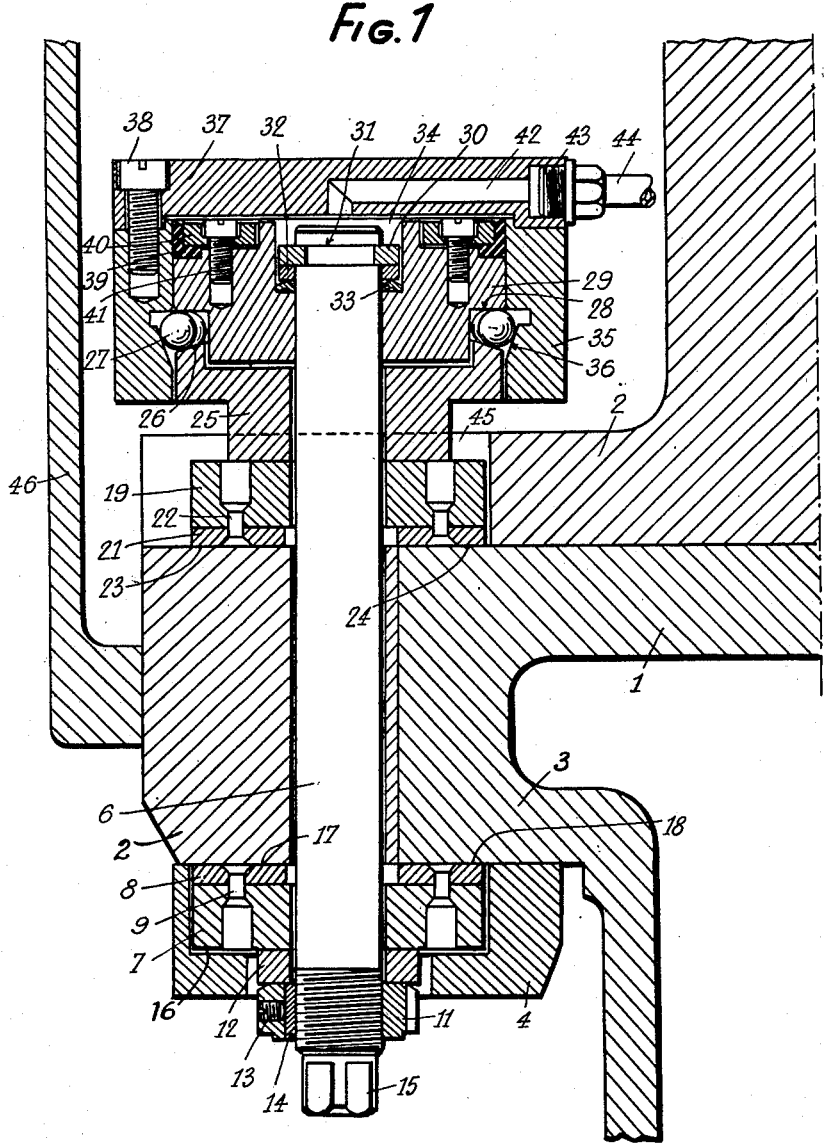

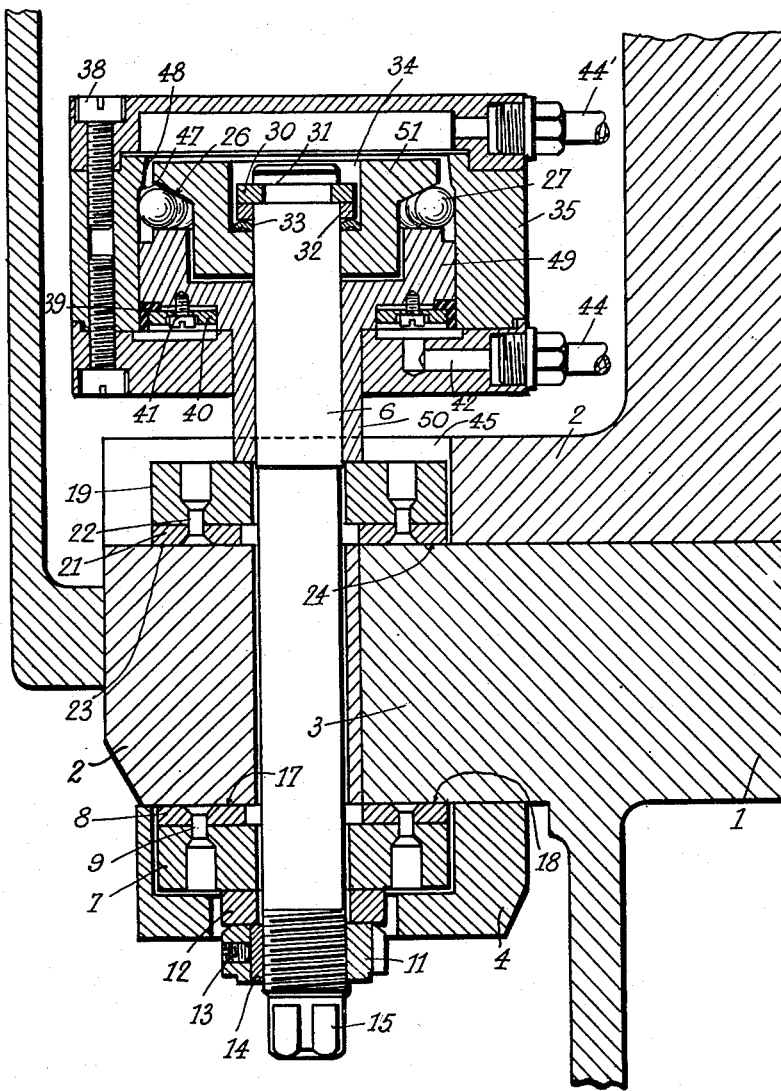

2,635,324

UNITED STATES PATENT OFFICE 2,635,324

CLAMPING DEVICE FOR SLIDES OF MACHINE TOOLS OR THE LIKE

Charles William Berthiez, Paris, France

Application February 25, 1949, Serial No. 78,273
In France March 1, 1948

6 Claims. (Cl. 29—1)

This invention relates to means for improving the utilisation of forces for generating pressure and other effects.

It is more particularly intended to utilize in a novel manner the multiplying properties of wedge action in the generation or increase of pressure to produce clamping, clutching, compressing, crushing and other effects in all fields of pressure application.

It is an object of this invention to provide mechanisms of simple design, allowing of low cost production, for creating an increase of pressure beyond that generated by the conventional pressing and compressing devices.

It is another object of this invention to provide improved means for clamping parts such as tool supports or other machine parts to the machine tool bed.

With these and other objects in view, I will now describe the gist of my invention and how the same is to be performed, having reference to the drawing which illustrates diagrammatically by way of example, one of the many applications of my invention.

According to this invention, three parts are arranged in co-axial relation, one of them embracing at least one of the other two parts. On the adjoining axially extending surfaces of the embracing and the embraced parts are formed relatively converging faces. Revolution bodies such as balls or rollers are inserted between these faces which constitute cam faces, and means are provided for forcing two of said co-axial parts to move axially relative to each other, whereby the revolution bodies will be forced to move in radial direction and to thereby exert a wedge action on these cam faces which will result in a multiplication of the force applied to move said two parts in axial direction.

Two of the coaxial parts may be disposed inside the third part and a groove having at least one cam face is formed between the two parts, while another groove with a cam face is provided on the third part.

In another embodiment of the invention the second groove is formed with two cam faces inclined at different angles to the axis and acting in succession on the balls or rollers, thereby subdividing the transmission of movement into a fast and a slow phase.

The device may be associated with a pressure fluid control system, one of the three co-axial parts acting as cylinder, another as piston, the fluid under pressure acting on at least one face of the piston. In this case a pressure fluid intake is provided at each cylinder end on either side of the piston so that the members will be controlled in both directions.

When the device is used for clamping a slide to its support, one of the co-axial parts is connected with a power transmission element extending through this part and through one of the other two parts, acting as a clamping jaw, while another part acts on another clamping jaw movable in a direction opposite to the first one, both jaws acting simultaneously on the slide and on its support.

In the drawings, two embodiments of my invention are illustrated:

Fig. 1 is an axial section of one embodiment of the invention as applied to the clamping of the slide of a machine tool.

Fig. 2 is an axial section of a second embodiment.

Referring first to Fig. 1, 1 is the machine tool bed and 2 is a carriage or slide held in any selected position along the slideway 3 of the machine bed by means of a flange 4 secured to the carriage 2 by means of screw bolts, not shown. A tie-rod 6 extending through the carriage 2 carries at its lower end a shoe 7 provided with a lining 8 of frictional material secured to the shoe 7 by means of rivets 9. The shoe 7 is held on the rod 6 by means of a nut 11 and a washer 12. The nut 11 may be locked by means of a screw 13 bearing against a shield 14 serving to prevent the screw 13 from injuring the threads of the tie rod. The lower end 15 of the tie rod 6 is square in cross section and can be held against rotation when the adjusting nut 11 is being rotated.

It will be noted that the shoe 7 is disposed within a recess 16 of the flange 4 with some clearance.

The lower shoe 7 bears with its frictional lining 8, on the one hand, against the lower face 17 of the carriage and, on the other hand, against the lower face 18 of bed slideway 3. Another shoe 19 embracing the upper part of the rod 6 is also provided with a frictional lining 21 secured to it by means of rivets 22. It rests partly on the upper face 23 of the carriage 2 and partly on the upper face 24 of the slideway 3. Both faces 23 and 24 extend substantially in the same plane, which is also true of the surfaces 17 and 18 associated with the lower shoe 7.

An annular member 25 bearing on the shoe 19 is formed with a frustoconical face 26 inclined outwardly and downwardly and supporting a circle of balls 27. A piston 29 having its bottom face 28 extending in a plane transverse to the tie rod axis rests on these balls. The tie rod 6 is supported by the piston 29 through a split washer 30 fitted in a circumferential groove 31 provided in the upper end of the tie rod and a second washer 32 which bears on a third washer 33 constituted by a deformable copper ring which, when flattened, forms a fluid tight packing. The split washer 30 and the head of the rod 6 are disposed in a recess 34 in the upper portion of piston 29. The piston is surrounded by a cylinder 35 which is formed on its inner wall with an inclined face 36 also engaging the balls 27 and registering substantially with the inclined face 26 of the annular member 25. The cylinder is closed on top by a cover plate 37 secured to it by means of screws 38. A leather packing ring 39 of conventional shape is fitted about the top of the piston 29 through a clamping ring 40 held by means of screws 41.

The cover plate 37 is formed with a radial conduit 42 into which is fitted the nipple 43 connecting thereto a pipe 44 supplying a fluid such as oil under pressure.

The conical face 26 of the annular member 25 and the cam face 36 of the cylinder 35 are inclined at an angle greater than the critical angle at which the balls might jam between these faces. The balls as well as the faces are hardened and accurately ground.

The upper shoe 19 is disposed within a recess 45 in the carriage 2, sufficient clearance being provided between the shoe and the carriage for preventing any jamming, the purpose of this recess being to maintain its orientation while it engages the carriage and slideway faces in the same manner as the lower shoe.

A casing 46 may surround the whole clamping mechanism.

Of course the arrangement of the cam faces 26—36 might be the reverse of that illustrated in Fig. 1, by providing the first cam face 36 in the piston 29 and having the other cam faces 26—28 formed by one face of the cylinder 35, and one face of the annular member 25.

It would be also possible to provide a cam face 26 on the piston and a plane face at right angles to the axis on the annular member 25.

The operation of the device above described is very simple. When oil under pressure is fed into the cylinder, it develops relative axial motion between the cylinder and the piston whereby the cam face 36 is moved upwards with respect to the set of balls 27, thus forcing the balls to ascend the inclined face 26 of the annular member 25 and move the piston 29 and annular member 25 away from each other.

Since the annular member 25 bears against the upper shoe 19, while the piston in rising tends to lift the tie rod 6 and with it the lower shoe 7, the two shoes are forced towards each other and exert a tight clamping action on the carriage 2 and on the slideway surfaces 18 and 24 of the bed 1.

In order to release the carriage, it will be sufficient to relieve the oil pressure and due to the steep angle of the ball-engaging cam face 36 the balls will return to their initial position whereby the shoes will be released.

In the embodiment described above the angle of inclination of the cam faces 26 and 36 is sufficiently steep to permit the release to be effected as soon as the pressure of the fluid fed into the cylinder 35 is lowered.

The purpose of the embodiment illustrated in Fig. 2 is to maintain the clamping action even when the fluid pressure in the cylinder is reduced. This requires the provision of another inlet for the fluid under pressure to provide for unclamping.

The embodiment of Fig. 2 is also designed to bring about a two step clamping action, i. e. one step wherein the stroke of the clamping shoes is relatively fast and occurs under a relatively low pressure and another step during which the rate of movement of the clamping shoes is very low but takes place under a very high pressure.

As illustrated in Fig. 2 the cylinder 35 has two adjoining cam faces 47—48 inclined at different angles in relation to the axis of the cylinder, both being directed outwardly and downwardly, the bearing surface 48 being steeper than the surface 47, that is, at a much smaller angle in relation to the axis of the cylinder than the surface 47.

The device is provided with two pressure fluid inlets 44 and 44', one at each cylinder end. Here the member 49 acts as a piston and is therefore fitted with the packing device formed of the pressed leather ring 39 secured by means of a clamping ring 40 fixed to the piston 49 by means of screws 41. In this case, it is the piston 49 that bears upon the shoe 19 through its extension 50.

The annular member 51 contained within the cylinder 35 will then constitute the transmitting member. It is formed with the cam face 26 and grips the tie rod 6 which transmits the force to the lower shoe 7.

The other parts are disposed as shown in Fig. 1.

It will be seen that in the case illustrated in Fig. 2, the associated pair of cam faces 47 and 48 of the cylinder 35 are set in opposite relationship to the cam face 36 of the cylinder shown in Fig. 1.

From the foregoing description it will be apparent that when a fluid under pressure is fed through the lower conduit 44, the piston 49 will be moved with respect to the cylinder 35 and this movement will tend to move the bottom face of the piston 49 away from the lower end of the cylinder. Thus the balls 27 will first engage the cam face 47 of the cylinder, whereby the balls will be moved at a relatively fast rate towards the axis of the device and, in consequence thereof, both members 49 and 51 will be also moved at a fast rate with respect to each other. This constitutes the first step of the clamping action and will cause the shoes 7, 19 to be quickly moved towards each other under low pressure to rapidly engage the corresponding members 2 and 3. Then in the second step, the balls 27 will travel on the less inclined cam face 48 and cause the members 49 and 51 to move at a slower rate with respect to each other, the two shoes 7 and 19, already engaging the members to be clamped, thus being moved toward each other at a slower rate.

During this second step the low speed at which the two shoes 7 and 19 are moved toward each other is accompanied by the exertion of a much greater force.

Since, in the case of Fig. 2 the angle of inclination of the cam face 48 is not sufficiently great to bring about the release of the shoes immediately on dropping the fluid pressure, such releasing action requires the other end of the cylinder to be supplied with fluid under pressure through the conduit 44', whereby the balls 27 will be disengaged from their jammed condition and will allow the cam face 48 to resume the releasing position illustrated in Fig. 2. For safety reasons, the oil pressure used for the release acts upon the upper face of the annular member 51 the area of which is larger than the area of the lower surface of the piston 49 to which the clamping pressure is applied.

Both embodiments of the device will provide a very powerful clamping effect, since it results from the combined action of two cam faces (26—36 in the first instance and 26—47 and 26—48 in the second) on the balls 27.

It is obvious that the new cam and ball device may be controlled by other than hydraulic means, for instance by an electric control device or a purely mechanical control apparatus.

I wish it to be understood that I do not desire to be limited to the exact details shown and described, since obvious modifications will occur to a person skilled in the art.

I claim:

1. In a clamping device, the combination with a pair of clamping shoes adapted to be moved with respect to each other in clamping and unclamping action, of two parts disposed upon a common axis for movement relative to each other in the direction along said axis, means respectively operatively connecting said parts to said clamping shoes to move said shoes with respect to each other for clamping action upon relative movement of said parts with respect to each other in a given direction along said axis, a member extending circumferentially with respect to said axis about said two parts and adapted for relative movement thereof with respect to both said parts in either direction along said axis, said member providing an annular internal frusto-conical surface coaxial with said axis, a given one of said two parts providing an annular external frusto-conical surface coaxial with and adjacently within said internal frusto-conical surface, the other of said two parts providing an annular surface of revolution about said axis adjacent said two frusto-conical surfaces of said given part and said member, and a revolution body disposed in tangential contact with said annular frusto-conical surfaces and said annular surface of revolution, the angular relation of said three annular surfaces being such that upon said relative axial movement of said member with respect to a selected one of said parts said revolution body is moved laterally of as well as parallel to said axis to move said other part in a predetermined direction along said axis with respect to said selected part, said parts being formed with openings therethrough within said annular surfaces with respect to said axis for receiving therein said operative connection from at least one of said parts to a clamping shoe.

2. In a clamping device, the combination as defined in claim 1 in which said member is in the form of a fluid pressure cylinder with said annular internal frusto-conical surface at the interior of the cylinder wall, said selected one of said two parts being in the form of a piston cooperating with said cylinder to confine a fluid under pressure between said member and said selected part for producing said relative movement of said member and said selected part to move said other part in said predetermined direction with respect to said selected part to produce clamping movement of said shoes.

3. In an hydraulic clamping device for slides of machine tools or the like, the combination with a slideway, a slide adapted to move along said slideway, and at least one clamping shoe adapted to engage simultaneously said slide and said slideway, of a cylinder internally provided with a frusto-conical portion, at least one cylinder head closing said cylinder at one end, a piston member movable in said cylinder and provided with an annular bearing surface at the face of said piston opposite to the face thereof disposed toward said cylinder head, a member coaxial with said cylinder and said piston and provided with an annular bearing surface, said annular surface of at least one of said members being frusto-conical, revolution bodies engaging said annular bearing surfaces and said frusto-conical portion of said cylinder, a tie rod coaxial with said cylinder and passing through said piston and said coaxial member, said tie rod being operatively connected at one of its ends to said clamping shoe and at its other end to one of said members provided with said annular bearing surfaces, and a fluid inlet opening between said cylinder head and said face of said piston member disposed toward said cylinder head for moving said piston member in a direction corresponding to the clamping action.

4. In an hydraulic clamping device for slides of machine tools or the like, the combination as defined in claim 3 in which a second clamping shoe is operatively connected to the other of said two members provided with annular bearing surfaces.

5. In an hydraulic clamping device for slides of machine tools or the like, the combination as defined in claim 3 in which said frusto-conical portion of said cylinder is subdivided into two differently inclined sections adapted in succession to cooperate with said revolution bodies as said piston member is moved in said cylinder.

6. In an hydraulic clamping device for slides of machine tools or the like, the combination as defined in claim 3 in which said cylinder is provided with cylinder heads at the respective sides of said piston, and a second fluid inlet is provided between the second cylinder head and said piston member for moving said piston member in a direction corresponding to unclamping action of said shoe.

CHARLES WILLIAM BERTHIEZ.

References Cited in the file of this patent

UNITED STATES PATENTS

| Number | Name | Date |
| --- | --- | --- |
| 2,140,658 | Van Sittert | Dec. 20, 1938 |
| 2,260,662 | Farrell | Oct. 28, 1941 |
| 2,319,231 | Hawley | May 18, 1943 |
| 2,338,707 | Boynton | Jan. 11, 1944 |
| 2,496,344 | Hall | Feb. 7, 1950 |